June 16, 1953  D. D. DUESENBERG  2,642,323
PISTON RING
Filed Dec. 29, 1949
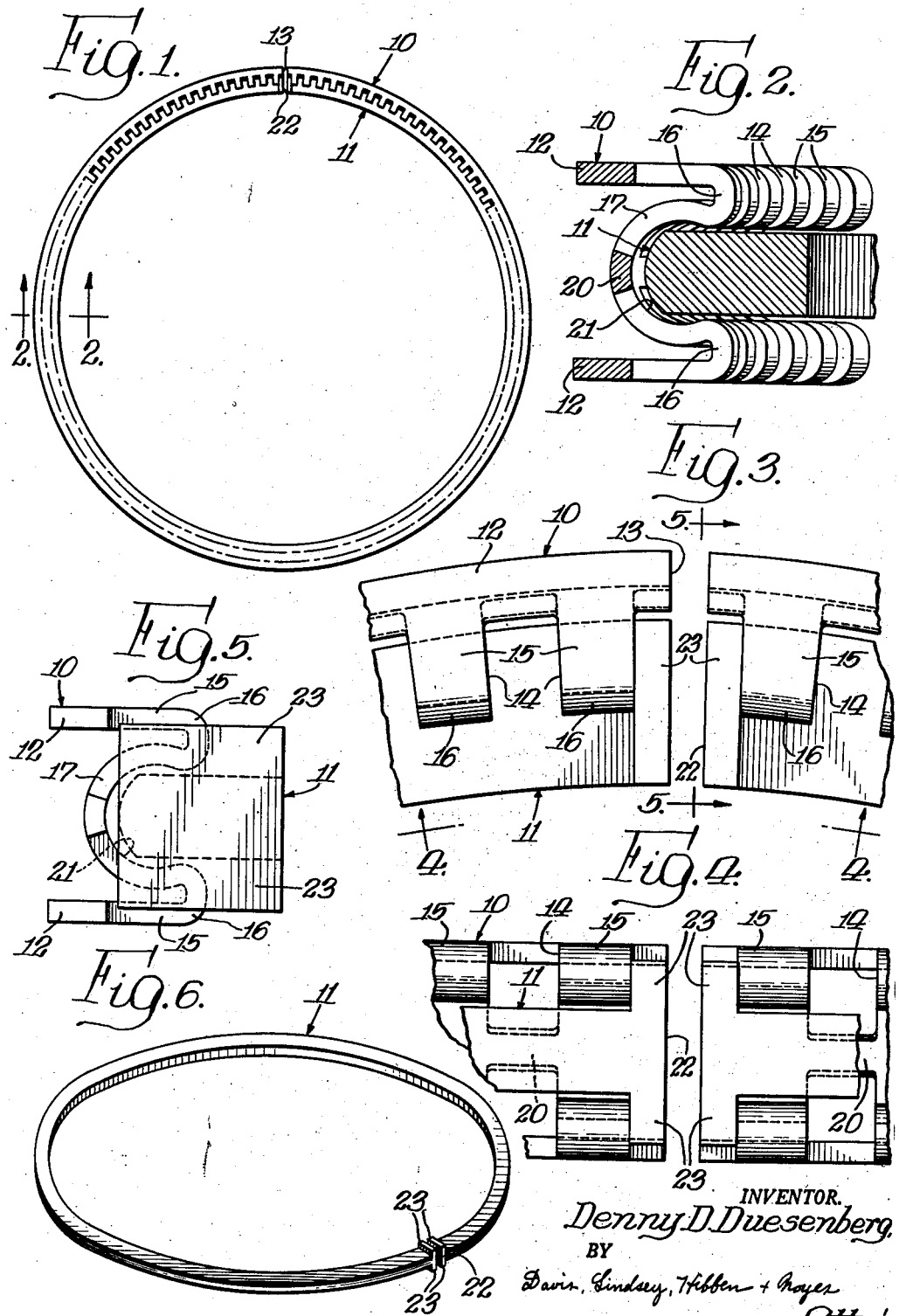
INVENTOR.
Denny D. Duesenberg
BY
Davis, Lindsey, Hibben & Noyes
Attys.

Patented June 16, 1953

2,642,323

UNITED STATES PATENT OFFICE 2,642,323

PISTON RING

Denny D. Duesenberg, Hagerstown, Ind., assignor to Perfect Circle Corporation, Hagerstown, Ind., a corporation of Indiana Application December 29, 1949, Serial No. 135,722

10 Claims. (Cl. 309—45)

The invention relates generally to piston rings, and more particularly to an oil control ring.

The general object of the invention is to provide a novel piston ring which exerts a relatively high expansive pressure and at the same time has a high degree of flexibility to readily conform to the cylinder wall.

More specifically, it is an object to provide a novel piston ring construction comprising a ring member formed in such a manner that it is highly flexible and thus capable of fully conforming to the cylinder wall, and a spring member capable of exerting a strong expansive force on the ring member and thus utilizing the flexibility of the ring member to maximum advantage.

Another object is to provide a ring of the foregoing character comprising a ring member and a spring member, in which the ring member is provided with radial openings for the flow of oil therethrough, and the spring member is so supported by the ring member that it may be said to float relative to the ring member and thus function to assist in keeping the ring member from becoming clogged with carbon.

A further object is to provide a novel piston ring construction comprising a ring member capable of being made of sheet metal and inexpensive to manufacture and a relatively stiff spring member of simple form.

Other objects and advantages will become apparent from the following description taken in connection with the accompanying drawings, in which:

Figure 1 is a plan view of a piston ring embodying the features of the invention.

Fig. 2 is an enlarged sectional view of the ring taken on the line 2—2 of Fig. 1.

Fig. 3 is a fragmentary, enlarged plan view of the ring and showing the portion of the ring adjacent the gap therein.

Fig. 4 is a fragmentary, enlarged view of the inner periphery of the ring, as indicated by the line 4—4 in Fig. 3.

Fig. 5 is an enlarged end view of the ring taken at the gap, as indicated by the line 5—5 of Fig. 3.

Fig. 6 is a perspective view of a spring member utilized as part of the ring.

In the design of a piston ring, particularly an oil control ring, the end sought in such designing has been to provide a ring which has relatively high flexibility, so that the ring member may readily conform to the exact shape of the cylinder wall as the piston reciprocates within the cylinder. However, usually when high flexibility is attained, there is consequent loss of expansive pressure or resilience in the ring so that full advantage of the flexibility cannot be taken. It is desired, of course, to obtain a high degree of flexibility or conformability to the cylinder shape and, at the same time, provide a high expansive pressure so that the ring will bear firmly against the cylinder wall at all points throughout the entire stroke of the piston.

The present ring is believed to have such desirable feature and consists of a two-part construction, one part comprising a highly flexible ring member and the other part being a stiff spring member for expanding the ring member. The flexibility of the ring member is preferably obtained by making it of sheet metal construction, where in the metal is punched away in such a manner as to provide the desired flexibility. The spring member, on the other hand, comprises a stiff annular element which is arranged to bear against the ends of the ring member at the gap therein so as to separate the ends and thus force the ring outwardly into close contact with the cylinder wall. In the preferred form, the ratio of stiffness of the spring member to the stiffness of the ring member is preferably at least 10:1, so that the lack of stiffness in the ring member due to its highly flexible construction is of no importance, because of the stiffness imparted by the spring member.

In the embodiment illustrated in the drawings, the ring member is shown generally at 10 while the spring member is indicated at 11. As heretofore mentioned, the ring member 10 is highly flexible and is made of a strip of sheet metal. Such strip is folded along longitudinal lines to provide a pair of cylinder-engaging flanges 12 which are continuous throughout the periphery of the ring member except for a gap 13 where the ends of the strip are located. The strip is transversely punched or apertured as at 14 to provide a plurality of circumferentially spaced web members 15 connecting the cylinder-engaging flanges 12. The cylinder-engaging flanges 12 comprise only the outer portion of the upper and lower surfaces of the ring member so that the web members 15 extend radially inward from the flanges 12 and then extend axially to connect the two flanges. The web members, in their intermediate portions, are reversely bent as at 16 to form loops 17 extending outwardly between the flanges 12. The loops 17 are integrally connected at the center line of the ring by circumferentially extending connecting portions 20.

The loops 17 thus form an inwardly opening groove, indicated at 21 in Figs. 2 and 5.

It will be apparent from the foregoing description that the ring member has a highly flexible construction since the cylinder engaging flanges comprise only a small portion of the total radial width of the ring and are connected by a plurality of spaced web members 15 which are free to flex to permit the ring member to conform fully to the exact shape of the cylinder bore. Such ring member, because of the very fact that it is flexible, does not have any great degree of stiffness. However, in the particular form of ring member herein illustrated, because the flanges 12 are continuous through the periphery of the ring, except for the gap, and the web members are connected within the loops 17 by the portions 20, there is some degree of stiffness in this particular construction.

The desired stiffness for the ring, however, is imparted by the spring member 11 which, in this instance, is shown as having a rectangular form in radial cross section with the longer dimension extending radially of the ring. Thus, such construction of the spring member provides a high degree of stiffness.

To permit the spring member 11 to exert the necessary expansive pressure on the ring member 10, the spring member 11 is provided with a gap 22 located at the gap 13 in the ring member and is formed at its ends to engage the ends of the ring member to force them apart, thus expanding the ring member into conformity with the cylinder wall. To this end, the spring member 11, at its ends, is provided with flange portions 23 extending axially from both faces of the spring member at both of its ends. The spring member 11 extends radially into the groove 21 formed by the loops 17 of the ring member and is preferably dimensioned so that it has less axial width than the width of the groove. The spring member thus freely floats within the groove 21. At the ends of the ring, the flange portions 23 engage the web members 15, chiefly the loop portions 17, so that the spring member 11 exerts a force tending to separate the ends of the ring and thus expand it into full contact with the cylinder wall. Preferably, the ring member is so formed that the web members at the ends of the ring are spaced circumferentially a short distance from the ends of the flange portions 12, as is evident in Figs. 3 and 4. The flange portions 23 are made of such thickness as just to fill such spacing so that the end faces of the flange portions 23 are flush with the end edges of the flanges 12. The flange portions 23 may be formed by upsetting the ends of the spring members, or pieces of metal suitably shaped may be welded to the ends of the spring.

When a ring of this construction is placed on a piston within a cylinder, the variations in the cylinder wall will cause a flexing of both the ring member and the spring member, and because the spring member freely floats within the groove 21 formed by the loops 17 of the ring member, there will be relative movement between the spring member and the ring member. Such relative movement consists in preventing the formation of carbon within the ring member that might tend to clog the openings therethrough and prevent the free flow of oil through the ring member.

The structure of the present ring provides a high degree of flexibility in the ring member, which permits it to readily conform to the shape of the cylinder wall under the expansive pressure exerted on the ring member by the spring member. Because of the high expansive pressure of the spring member, the ring member will be caused to conform with a high degree of exactitude to the actual shape of the cylinder wall throughout the entire periphery of the ring and at all portions of the stroke of the piston within the cylinder. Thus, the present ring attains a highly desirable feature, particularly where the ring is utilized as an oil control ring.

I claim:

1. A piston ring comprising a ring member having a gap and comprising a pair of axially spaced cylinder-engaging flanges integrally connected by circumferentially spaced web members extending radially inward from the flanges whereby the flanges comprise only a portion of the radial width of the ring member to render the latter radially flexible, and an annular spring member substantially stiffer than and positioned within said ring member and provided with a gap, said spring member having its ends engaging the ends of the ring member and tending to force the ends of the ring member apart to expand the ring member and thereby hold said flanges in engagement with the cylinder.

2. A piston ring comprising a ring member having a gap and comprising a strip of sheet metal transversely apertured and folded longitudinally of the strip to provide a pair of cylinder-engaging flanges connected by circumferentially spaced web members, whereby said ring member is rendered flexible and readily conformable to the cylinder, and an annular spring member substantially stiffer than said ring member and having a gap with its ends engaging the ends of the ring member to force the ends of the ring member apart and thereby expand the ring member into conformity with the cylinder.

3. A piston ring comprising a ring member having a gap and comprising a pair of cylinder-engaging flanges and circumferentially spaced connecting web members having their intermediate portions bent outwardly, said ring member being readily conformable to the cylinder, and an annular expander spring having a gap with its ends circumferentially engaging the ring member at the gap to expand the latter and thereby cause it to conform to the cylinder, said expander spring extending around the ring member within the outwardly bent intermediate portions of said web members.

4. A piston ring comprising a ring member having a gap and comprising a pair of cylinder-engaging flanges and circumferentially spaced connecting web members reversely bent to extend between said flanges and thereby providing an inwardly opening groove, said ring member being readily conformable to the cylinder, and an annular expander spring having a gap with its ends circumferentially engaging the ring member at the gap to expand the ring member into conformity with the cylinder, said expander spring extending radially into said groove and floating freely therein so that its expansive force is exerted on the ring member only at the ends thereof.

5. A piston ring comprising a ring member having a gap and comprising a pair of cylinder-engaging flanges and circumferentially spaced connecting web members reversely bent to extend between said flanges and thereby providing an inwardly opening groove, said ring member being readily conformable to the cylinder, and an annular expander spring having a gap with its ends engaging the ring member at the gap to expand the ring member into conformity with the cylinder, said expander spring being substantially rectangular in radial cross section and extending edgewise into said groove with the thickness of the spring less than the width of said groove so as to freely float therein and thereby exert its expansive force only on the ends of the ring member.

6. A piston ring comprising a ring member having a gap and comprising a pair of cylinder-engaging flanges and circumferentially spaced connecting web members, said ring member being readily conformable to the cylinder, and an annular expander spring having a gap and provided with flange portions at each of its ends extending axially from each side of the spring and engaging the ends of the ring member to force the ends of the ring member apart and thus expand the ring member into conformity with the cylinder.

7. A piston ring comprising a ring member having a gap and comprising a pair of cylinder-engaging flanges and circumferentially spaced connecting web members reversely bent to extend between said flanges and thereby providing an inwardly opening groove, said ring member being readily conformable to the cylinder, and an annular expander spring extending into said groove, said spring having a gap and being provided with flange portions at each of its ends extending axially from each side of the spring and engaging the reversely bent portions of the web members at the ends of the ring member to expand the ring member into conformity with the cylinder.

8. A piston ring comprising a ring member having a gap and comprising a pair of cylinder-engaging flanges and circumferentially spaced connecting web members reversely bent to extend between said flanges and thereby providing an inwardly opening groove, said ring member being readily conformable to the cylinder, and an annular expander spring substantially rectangular in radial cross section and extending edgewise into said groove and freely floating therein, said spring having a gap and being provided with flange portions extending axially from each face of the spring at each end thereof and engaging the reversely bent portions of the web members at the ends of the ring member to expand the ring member into conformity with the cylinder.

9. A piston ring comprising a ring member having a gap and comprising a pair of cylinder-engaging flanges and circumferentially spaced connecting web members reversely bent to extend between said flanges and thereby providing an inwardly opening groove, said ring member being readily conformable to the cylinder, and having at each of its ends a web member spaced circumferentially from the ends of the flanges, and an annular expander spring extending into said groove, said spring having a gap and being provided with flange portions extending axially from each side of the spring at each end thereof and engaging the reversely bent portions of the web members at the ends of the ring member to expand the ring member, said flange portion having a circumferential thickness substantially equal to the spacing of the web members from the ends of the flanges of the ring member whereby said flange portions are positioned substantially flush with the ends of the flanges of the ring member.

10. A piston ring comprising a flexible ring member having a gap and comprising a pair of axially spaced cylinder-engaging flanges integrally connected by circumferentially spaced web members providing openings for the passage of oil radially through the ring, and an annular spring member positioned within said ring member and provided with a gap, said spring member having its ends engaging the ring member at its respective ends and tending to expand the ring member to hold said flanges in engagement with the cylinder, said spring member throughout its length extending adjacent said web members and being movable relative to said web members on expansion and contraction of the ring and thereby preventing formation of carbon in said openings.

DENNY D. DUESENBERG.

References Cited in the file of this patent

UNITED STATES PATENTS

| Number | Name | Date |
| --- | --- | --- |
| 1,348,641 | Hachmann | Aug. 3, 1920 |
| 2,280,745 | Bowers | Apr. 21, 1942 |
| 2,334,243 | Bowers | Nov. 16, 1943 |
| 2,364,743 | Morton | Dec. 12, 1944 |
| 2,426,385 | Bowers | Aug. 26, 1947 |

FOREIGN PATENTS

| Number | Country | Date |
| --- | --- | --- |
| 412,695 | Great Britain | July 5, 1934 |
| 863,465 | France | Jan. 2, 1941 |